United States Patent
Maynard

(10) Patent No.: US 7,042,890 B2
(45) Date of Patent: May 9, 2006

(54) METHOD AND APPARATUS FOR SHARING CONNECTION STATE INFORMATION BETWEEN MULTIPLE PROCESSING ELEMENTS

(75) Inventor: William P. Maynard, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 833 days.

(21) Appl. No.: 10/112,167

(22) Filed: Mar. 28, 2002

(65) Prior Publication Data

US 2003/0185219 A1 Oct. 2, 2003

(51) Int. Cl.
*H04L 12/28* (2006.01)

(52) U.S. Cl. ...................... 370/401; 370/392
(58) Field of Classification Search ............. None
See application file for complete search history.

(56) References Cited

U.S. PATENT DOCUMENTS

| | | | | |
|---|---|---|---|---|
| 5,745,699 A | * | 4/1998 | Lynn et al. | 709/245 |
| 6,310,881 B1 | * | 10/2001 | Zikan et al. | 370/401 |
| 6,807,156 B1 | * | 10/2004 | Veres et al. | 370/252 |
| 2002/0016835 A1 | | 2/2002 | Gamerman | |
| 2002/0176355 A1 | * | 11/2002 | Mimms et al. | 370/216 |
| 2003/0014399 A1 | * | 1/2003 | Hansen et al. | 707/3 |

FOREIGN PATENT DOCUMENTS

WO WO 02/23862 3/2001

OTHER PUBLICATIONS

Morales et al., "Design of a Header Processor for the PSi Implementation of the Logical Link Control Protocol in LANs", 0-8186-6395-Feb. 1994, pp. 270-277.

* cited by examiner

*Primary Examiner*—Duc Ho
(74) *Attorney, Agent, or Firm*—Blakely, Sokoloff, Taylor & Zafman LLP

(57) ABSTRACT

Described herein is a method and apparatus for sharing connection state information between multiple processing elements.

27 Claims, 10 Drawing Sheets

Fig. 1 100

METHOD AND APPARATUS FOR SHARING CONNECTION STATE INFORMATION BETWEEN MULTIPLE PROCESSING ELEMENTS

TECHNICAL FIELD

The present invention generally relates to the field of network system management and specifically to a method and apparatus for sharing connection state information between multiple processing elements.

BACKGROUND

Various methods are used to couple and cascade network appliances, microprocessors, and other processing elements. In a network using a data packet protocol, the data packets meant for a certain processing element must reach their target efficiently, unhindered by the manner in which the processing elements are coupled together. Sometimes an otherwise desirable configuration for coupling processing elements loses effectiveness because the configuration itself causes a bottleneck for the packet traffic.

Network appliances, for example, have been cascaded successfully in some configurations, subject to the aforementioned loss of effectiveness. For instance, network appliances that offload functions traditionally implemented on a server can be cascaded serially between a switch and a router to accelerate various applications for an entire server farm (multiple servers). However, the performance of the network services provided by these cascaded appliances can suffer if the particular cascade configuration causes a traffic bottleneck for the data packets.

One type of traffic bottleneck occurs when processing elements are cascaded to increase flexibility and performance scaling. The first inline processing element, however, is overworked trying to sort and extract its own data packets from those to be forwarded to subsequent processing elements. These latter processing elements remain relatively inactive because of the bottleneck. Even if the first processing element in the series does not create a dam against free packet flow, in some configurations data packets intended for only one processing element are sent to all, resulting in each device having to waste computing resources to sort through data intended for another device.

A processing element, such as a network appliance, may itself contain multiple processing elements, coupled and cascaded with the same susceptibility to data packet bottlenecks as separate devices cascaded together. The problem of wasting processing power to Who sort through data packets intended for another device remains even when the multiple processing elements are inside a single package.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

The present invention is generally directed to a method and apparatus for sharing connection state information between multiple processing elements.

According to one embodiment of the present invention, a connection state information manager (CSIM) is introduced to facilitate the implementation of applications across multiple processing elements, such as network appliances. In its various embodiments, a CSIM may examine network data traffic, for example at wire speed, and direct data packets to their proper destination without the burden of sharing connection state information between the processing elements. A CSIM may also distribute data packets among multiple processing elements and/or ASICs within a single appliance. In the case of multiple network appliances (or other processing elements) cascaded together to provide increased processing capacity, a CSIM provides a way for each appliance in the cascade to determine which traffic it needs to process and which can be ignored, without wasting intensive processing power.

Instead of copying complete connection state information between processing elements, the CSIM uses probability to determine which processing element needs to "see" a particular data packet. For instance, some embodiments use a probability table ("count table") to store an to integer value representing the probability that a data packet is relevant to a processing element. This technique has provided unexpectedly accurate and fast packet directing results. The sharing of state information using only a probability value will be discussed in more detail below.

To facilitate the implementation of applications across multiple processors, a CSIM may split and/or clone the protocol stack(s) supporting one or more applications among one or more packet classification engines (PCEs) and one or more application engines (AEs) and further, among components of the AEs. The PCE(s) assume the packet-classifying role discussed above, sending data packets only to relevant applications instead of requiring each application to use processing power to reject data intended for another device. The AEs administer one or more applications, allowing the applications to take advantage of the packet classifying power of a PCE. Thus, applications using an AE will not need to be "aware" of much of the packet load being handled by the PCE.

Example Architectures

Figure 1:
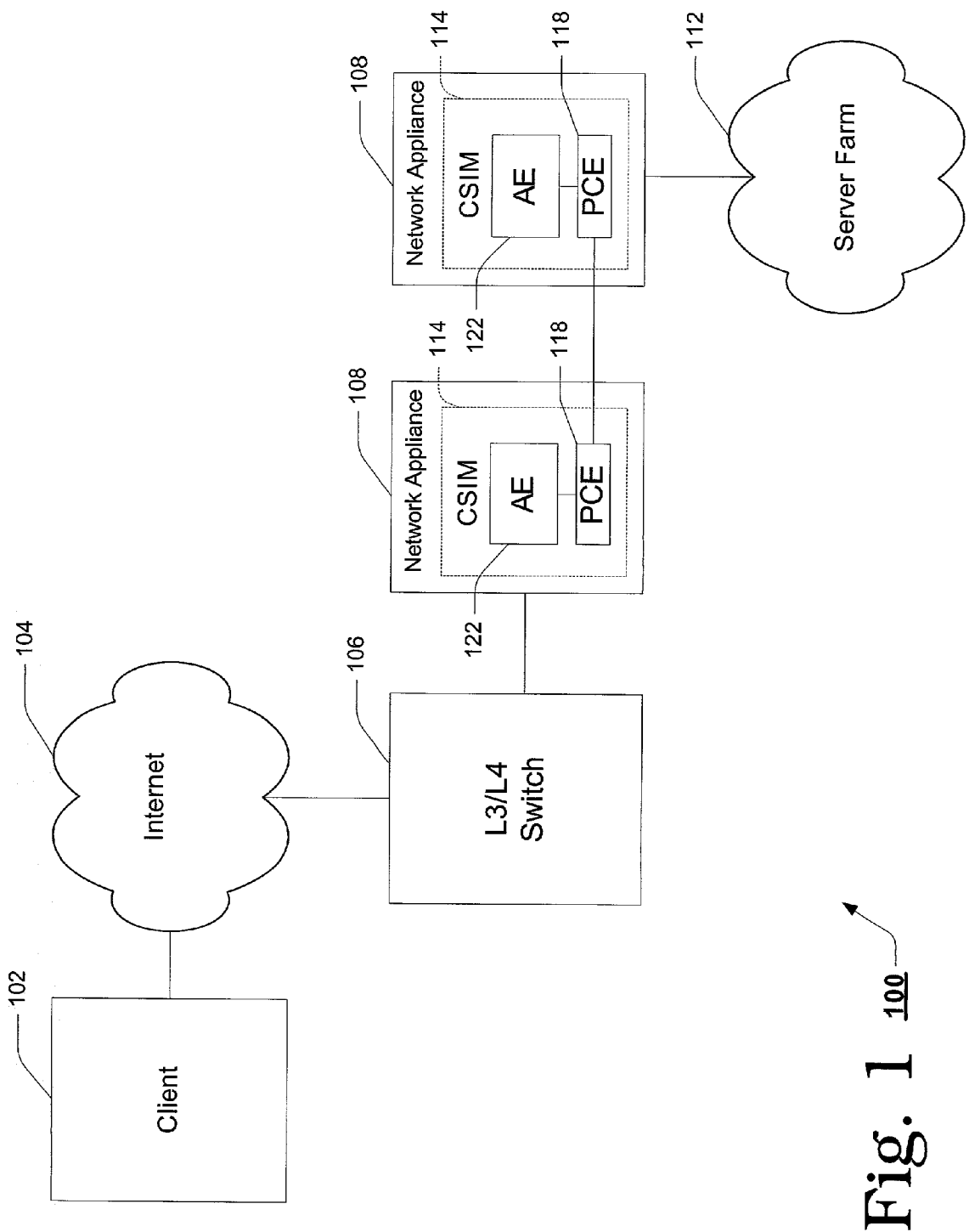
FIG. 1 is a block diagram of an example networking environment in which two connection state information managers (CSIMs) of the invention are implemented.

Turning to FIG. 1, a block diagram of an example networking environment 100 for practicing example embodiments of the invention is depicted comprising cascaded example network appliances 108; a server farm 112; an example switch 106; a network, such as the Internet 104; and a client computing device 102 communicatively coupled as illustrated. The network appliances 108 each include example CSIMs 114 to facilitate one or more services that the network appliances 108 provide for the server farm 112.

Each CSIM 114 may offload protocol stack duties to its PCEs 118 from its respective AEs 122. CSIMs 114 preferably include one PCE 118 and one AE 122, however, any number of PCEs 118 and AEs 122 are permissible in a CSIM 122.

A PCE 118 usually performs its data packet classification on layer three (L3) and layer four (L4) of the International Standards Organization (ISO) Open Systems Interconnection (OSI) communication model. The PCE 118 examines the incoming data stream looking for packets associated with connection oriented network protocols like TCP. The AE 122 shares connection state information with a PCE 118, allowing the PCE 118 to perform at wire speed some of the same protocol processing that would normally be performed solely by the AE 122. At wire speed the PCE 118 determines which packets need to be processed by its coupled AE 122. Those packets that do not need processing by the AE 122 are passed at wire speed (physical media line rate) on to a subsequent PCE 118 for possible processing by a subsequent AE 122. The overall effect of a CSIM 114 is to enhance the application layer processing performed by the network appliance by reducing the amount of low level (OSI layers 3 and 4) processing that is performed by the AE 122.

Figure 2:
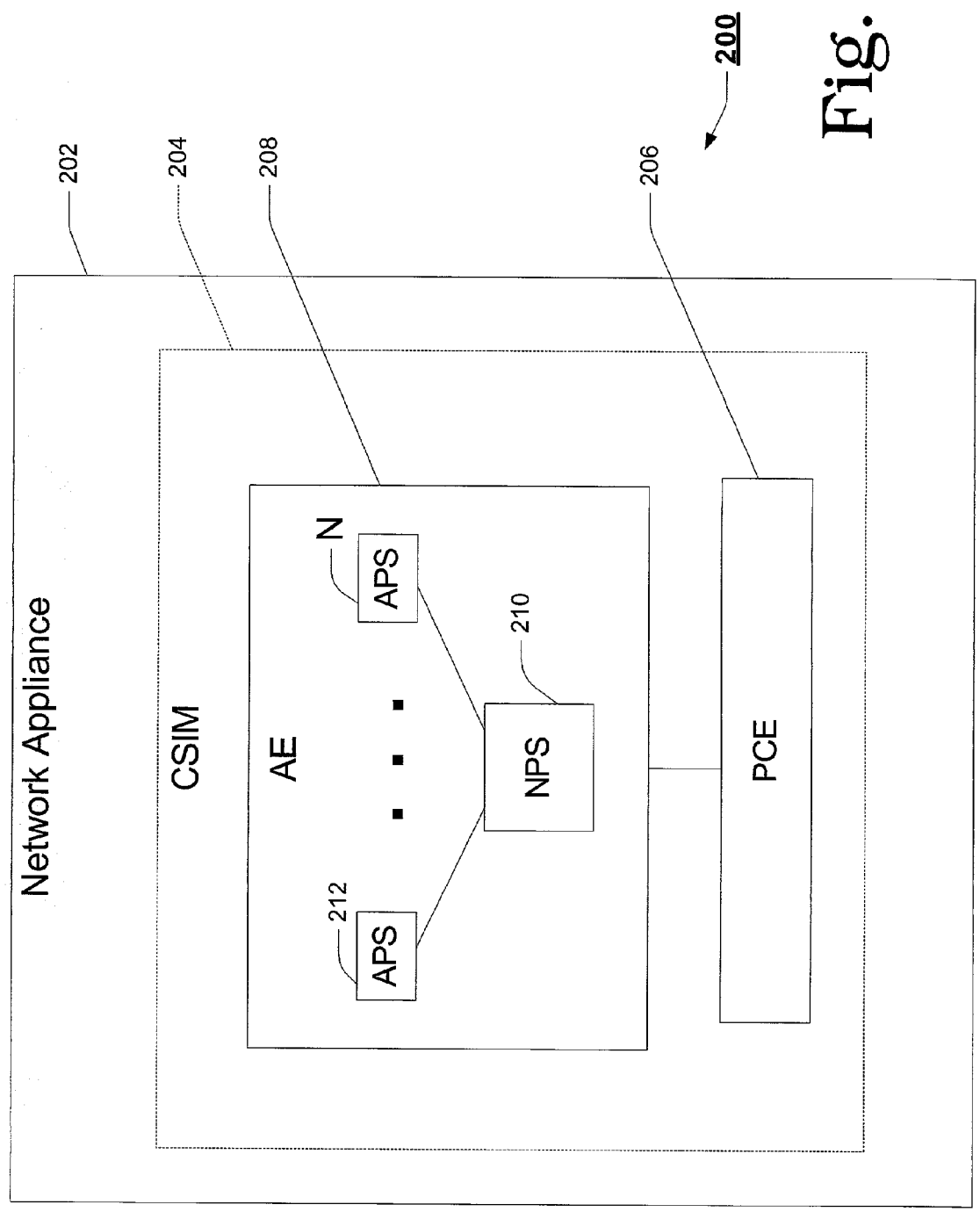
FIG. 2 is a block diagram of a network appliance having an example CSIM, according to one embodiment of the invention.

FIG. 2, is a block diagram of an example network appliance 202 having an example CSIM 204. The example CSIM 204 has one PCE 206 and one AE 208 communicatively coupled as illustrated. As mentioned, other embodiments of a CSIM 204 may include multiple PCEs 206 and multiple AEs 208 in any combination. A typical AE 208 includes one network protocol stack (NPS) 210 and between and "N" application protocol stacks (APSs) 212, . . . , N, coupled to the NPS 210 as illustrated. The NPS 210 typically performs the network protocol duties (L4 processing) usually implemented in the operating system kernel. APSs 212, . . . , N are the applications which typically provide the higher protocol layers (L5–L6 processing). Thus, the PCE 206 classifies data packets so that only data packets relevant to one of the applications running on an APS 212, . . . , N will be sent to the AE 208. The NPS 210 further directs the packets to the proper application using network protocol.

Figure 3:
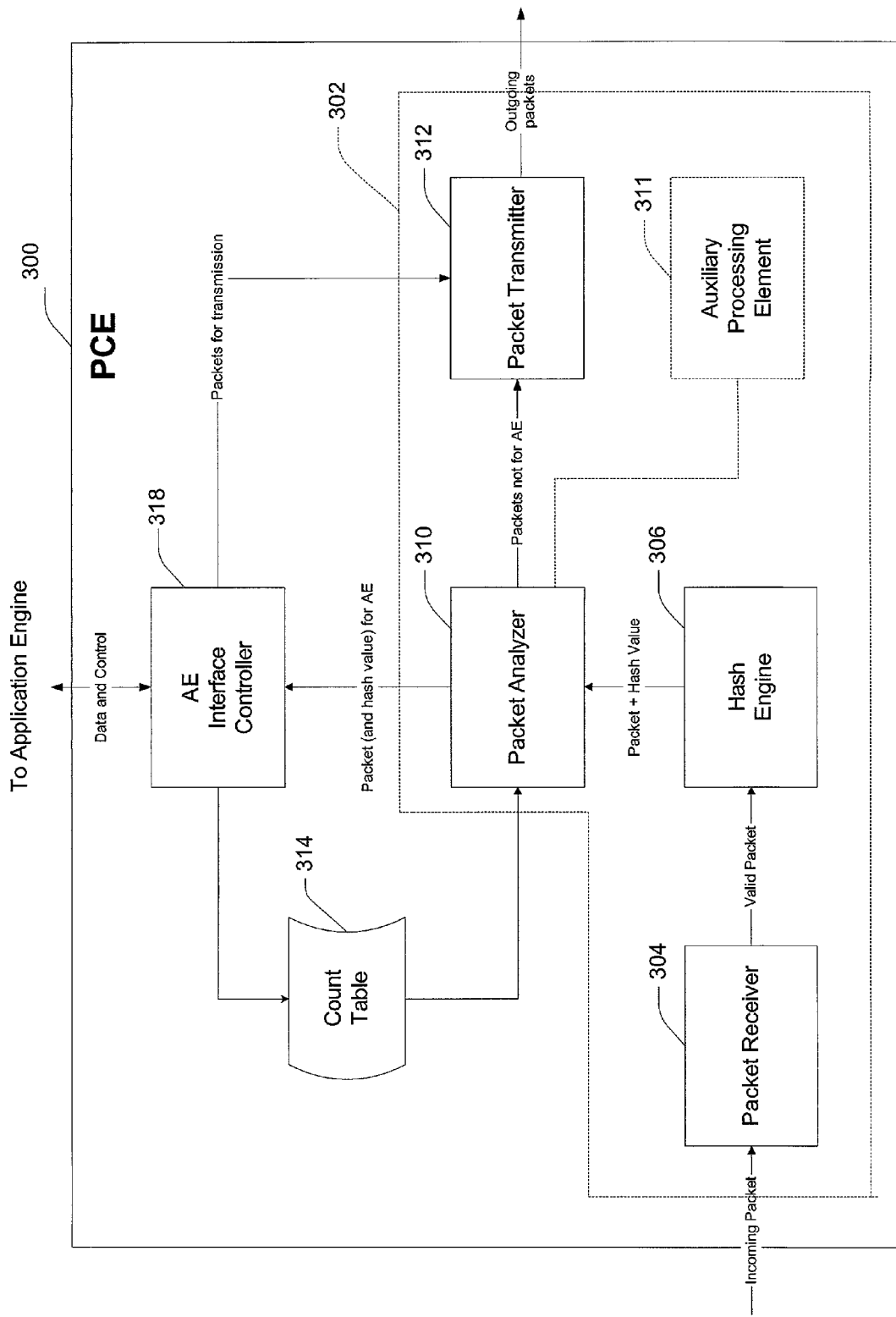
FIG. 3 is a block diagram of an example data packet classification engine (PCE), according to one embodiment of the invention.

FIG. 3 is a block diagram of an example PCE 300 in greater detail, according to one embodiment of the invention. A packet processing engine 302 includes one or more of a packet receiver 304, a hash engine 306, a packet analyzer 310, and a packet transmitter 312 communicatively coupled as illustrated. Optionally, an auxiliary processing element 311 may be included inside (and in some variations, outside) the packet processing engine 302. A count table 314, and at least one AE interface controller 318 are also communicatively coupled with the packet processing engine 302 and with each other as illustrated.

Using Probability to Direct Data Packets

Surprisingly little state information from each AE is necessary for the PCE 300 to be able to classify data packets correctly and achieve a statistically low miss rate in sending data packets to the correct AE. (An AE can return missed data packets to the PCE 300 for further forwarding.) In fact, the complexity of sharing an entire table of state information, such as connection state information, would lead to inefficient protocol decision-making and an overall degradation of data throughput between clients and servers.

The PCE 300 does not need to keep an exact copy of the state information kept by an AE. The information shared between PCEs and AEs must only capture the logical essence of the state information but does not need to consist of all details, such as the bulky address and port parameters of each connection, in the case of connection state information.

A CSIM 204 reduces the complexity of this connection state information shared between a PCE 300 and one or more AEs by reducing the connection state information to a single probability value to be associated with each incoming data packet. That is, each current connection in an AE is summarized by a single probability value that can be matched with information in a data packet. In one embodiment, information in each data packet is hashed to yield a hash index, which is then used to consult a table and obtain the corresponding probability value. The probability value corresponding to a given data packet is used by the PCE 300 to decide whether the data packet is relevant to a given processing element in the AE.

This connection state information may be represented by a single probability value, according to one aspect of the invention, because the PCE 300 does not need to perform perfect data packet classification. High performance is assured if the number of misses by the PCE 300 in sending data packets to the AE(s) can be kept to a statistically low number. An AE can return an irrelevant data packet to the PCE 300 for further forwarding thereby allowing a single probability value to be used as the packet-directing criterion in the PCE 300 instead of, for example, exact TCP connection state information that must be stored in a linked list and synchronized exactly with an AE 122.

In one embodiment, the division of the TCP stack between processing elements is accomplished efficiently by sharing only enough information between an AE and a PCE 300 such that:

There is a finite probability that a data packet might be sent to an AE for an application and/or a connection that is irrelevant to the AE. In this case, the AE will always return the data packet to the PCE for potential forwarding to another AE.

A data packet associated with an AE connection will always eventually be sent to the correct AE.

Thus, the PCE 300 can maintain a mere shadow copy of the TCP connection state information and the shadow copy can even be reduced to the probability count table 314 containing a count, such as an integer value, that a given data packet is associated with a real connection in a given AE.

In one embodiment, the probability value may be obtained by incrementing an initial zero value associated with the hash of a data packet in the count table 314. That is, when a data packet from a new connection is received by a CSIM 204, the AE 208 portion of the CSIM 204 keeps track of its own connection state information and also notifies the PCE 300 to increment the probability value corresponding to the new hash by one unit. For example, if there are no connections for a given hash, the probability value in the count table 314 for that hash is zero. When a data packet yielding that hash is received and the data packet represents a new connection, the probability value corresponding to that hash in the count table 314 is incremented from zero to one. When another data packet representing a further new connection for the AE 208 yields the same hash, the probability value associated with that hash is incremented from one to two. If a connection corresponding to that hash is deleted from the AE 208, the probability value is decremented by one. Thus, even though different connections might theoretically yield the same hash, each active connection corresponding to the common hash can increment or decrement the probability value for that hash.

If there are any active connections corresponding to a given hash, then the probability value associated with that hash is non-zero. When the packet analyzer 310 receives a data packet and its hash, it must determine where to send the data packet. Using a threshold, the packet analyzer 310 sends the data packet to the processing engine if the probability value is above the threshold and forwards the data packet elsewhere if the probability value is equal to or below the threshold. For example, when zero is selected as the threshold, if the probability value for the hash is zero there is very little probability that the AE 208 corresponding to the count table 314 has a protocol connection relevant to the data packet, i.e., it is not the proper destination for the data packet. If the probability value for the hash is non-zero, then there is very little probability that the AE 208 corresponding to the count table 314 does not have a protocol connection relevant to the data packet, i.e., it is the proper destination for the data packet. The threshold selected depends on the numbering and/or incrementing scheme selected for use in the count table 314. Zero is an appropriate threshold for the probability decision-making if chosen to represent an absence of any current protocol connections, and incrementing the probability value integrally by one for each new protocol connection is appropriate for ease of administration. However, thresholds other than zero could be used, and other methods for incrementing the probability value could be used as well.

Figure 4:
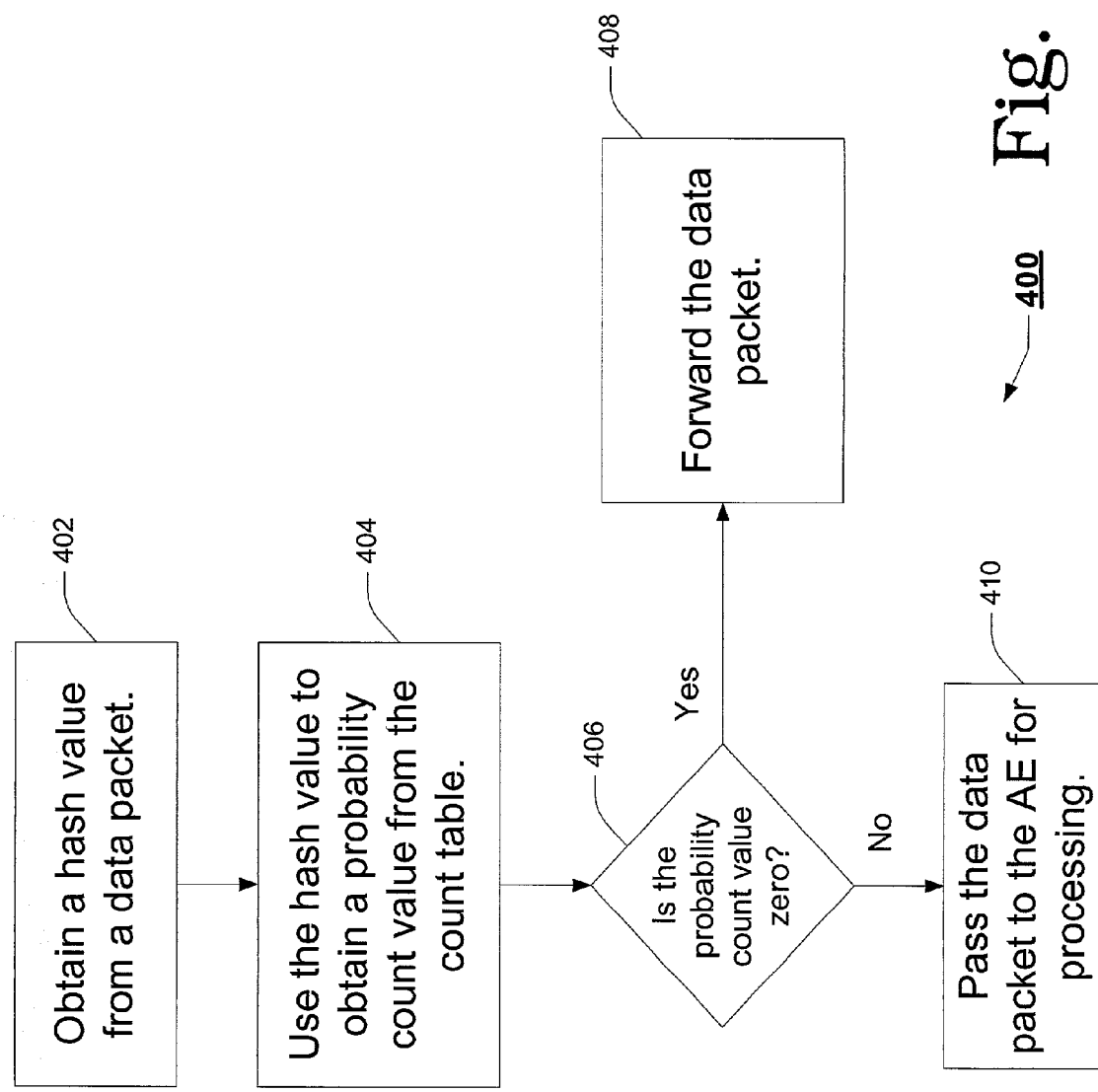
FIG. 4 is a flow chart of an example method of classifying a data packet, according to one embodiment of the invention.

FIG. 4 is a flowchart of an example method (400) of implementing a PCE 300. A header or other part of a data packet is hashed to obtain a hash value (also called a "hash index," or just a "hash") of connection state information (402). Each hash index is used by the packet analyzer 310 to index into the count table 314 corresponding to an AE 500 and to obtain the probability count associated with the particular hash index (404). The probability count is analyzed to decide whether to send the data packet to the AE 500, or instead, elsewhere (406). If the packet analyzer 310 does not find a relevant AE 500 for the data packet, the packet is sent to the packet transmitter 312 for forwarding (408). If the count is nonzero, then there is only a very low probability that the data packet is irrelevant to the AE 500. In this case, the data packet is passed to the AE interface 318 for transmittal to the relevant AE 500 for processing (410).

Figure 5:
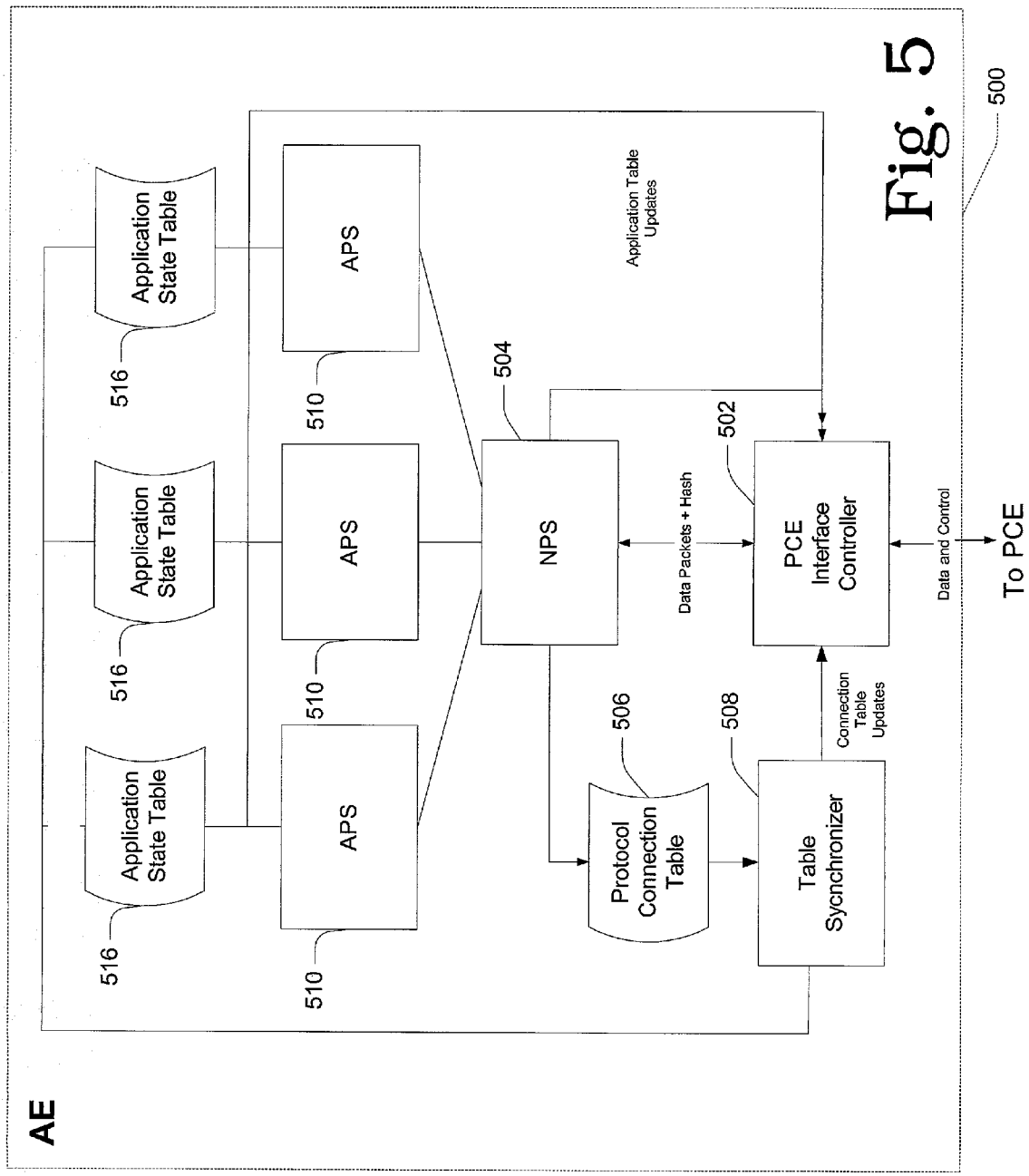
FIG. 5 is a block diagram of an example application engine (AE), according to one embodiment of the invention.

FIG. 5 is a block diagram of an example AE 500 in greater detail, according to one embodiment of the invention. An NPS 504 implements a set of protocol layers assigned to the AE 500. The NPS 504 is the protocol stack that is usually implemented in the kernel. One or more APSs 510 process application(s), such as HTTP or SSL. Current protocol connection state information is stored in a protocol connection table 506, which is communicatively coupled to a table synchronizer 510 for updating information between the protocol connection table 506 and the count table 314 of the PCE 300. The table synchronizer may optionally be integrated into the fabric of the AE 500. A PCE interface controller 502 is included for exchanging data with a PCE 300.

One or more application state tables 516 may also be included to store application state information, for example SSL session state information, directly associated with a protocol connection, such as a TCP connection. Information from an application state table 516 can be shared with the PCE 300. The PCE 300 may use the application state information to decide whether to perform additional processing on the data packet before sending it to the AE 500. In one embodiment, the PCE 300 may send and/or offload the data packet to an auxiliary processor 311 before forwarding the data packet to the AE 500. Bulk encryption/decryption, for instance, could be outsourced to a separate cryptography processing element (311), before the PCE 300 forwards the data packet to the AE 500.

Figure 6:
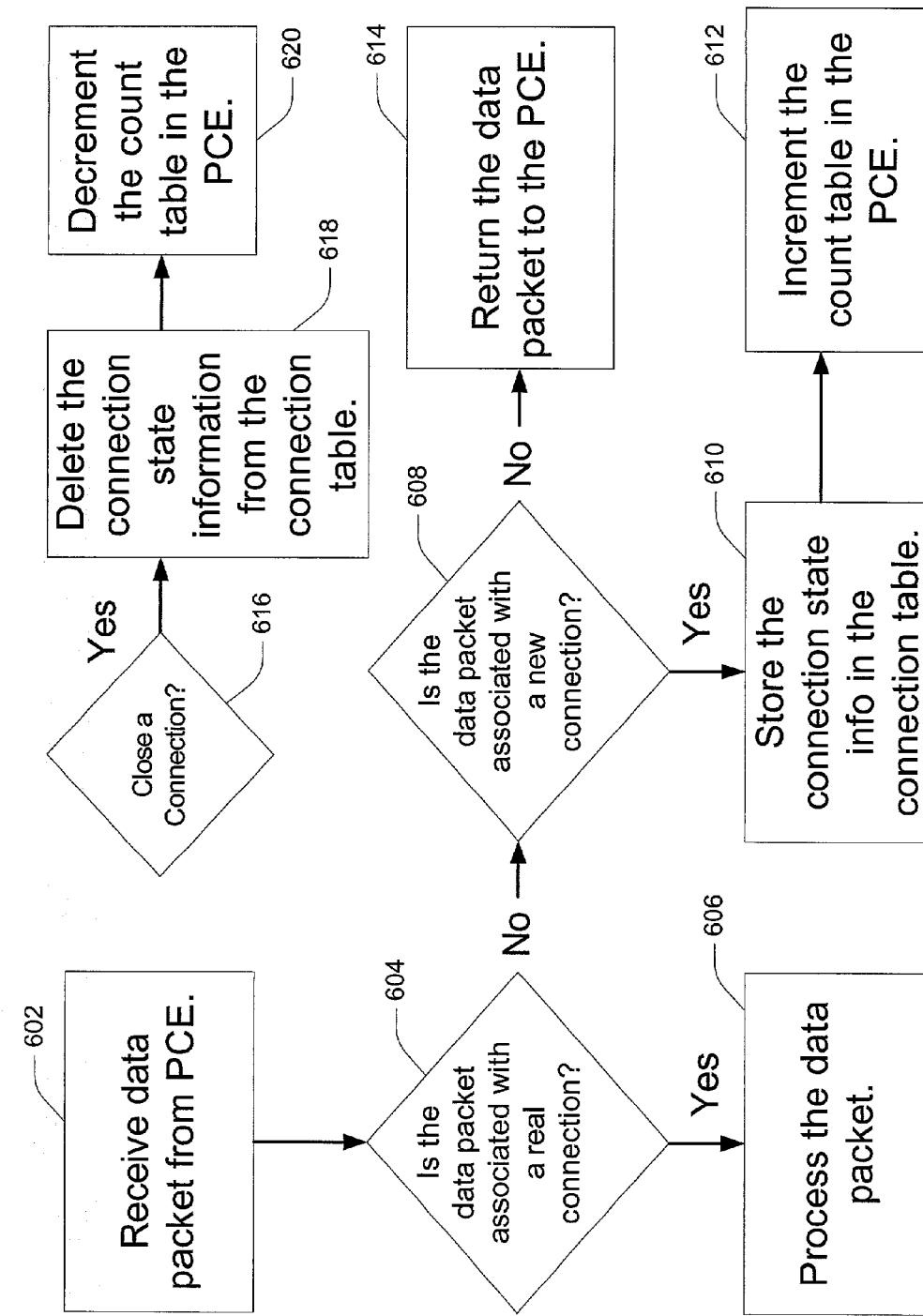
FIG. 6 is a flowchart of an example method of processing a data packet within an AE, according to one embodiment of the invention.

FIG. 6 is a flowchart of an example method (600) for implementing an AE 500. A data packet sent from the AE interface controller 318 of a PCE 300 is received by the AE 500 through the PCE interface controller 502 (602). The NPS 504 determines whether the data packet is associated with an application and/or a real protocol connection, such as a TCP connection, that is currently relevant to the AE 500 (604). If the data packet is associated with a relevant application and/or a real protocol connection then the data packet is forward to the relevant APS 510–514 to be processed (606). If the data packet is not associated with an application and/or a protocol connection that is currently relevant to the AE 500, then the NPS 504 further determines whether the data packet is a packet for initiating a new connection, for example, a synchronization packet (SYN-packet) for starting a new TCP connection (608). If the data packet is a packet for initiating a new connection, the packet is accompanied by the hash value and the NPS 504 stores relevant connection state information from the data packet (and may store the hash value) in a protocol connection table 506 (610). As soon as the NPS 504 updates its protocol connection table 506 to store new connection state information, the table synchronizer 508 sends an update to the PCE 300 to increment, in the count table 314, the probability count associated with the hash value for the new connection (612).

In the unlikely event that the data packet is not associated with a current application and/or a current protocol connection and is not a data packet for initiating a new protocol connection, the NPS 504 sends the data packet through the PCE interface controller 502 to be returned to the PCE 300 for forwarding (614). The PCE 300 typically forwards the missed data packet to another AE, to another PCE, and/or exports the data packet from the CSIM 204. The data packet forwarding thus depends on the configuration, that is, the number of PCEs and AEs in the CSIM 204 in which the PCE 300 resides. For example, in a CSIM 204 having multiple AEs but only one PCE 300, the missed data packet would be forwarded directly to the next AE whose count table 314 in the PCE 300 indicates the possibility of a relevant application and/or protocol connection. If the data packet, however, is associated with a current application and/or a real protocol connection that is relevant to the AE 500, then the relevant APS 510–514 processes the data packet (608).

When an application connection and/or a protocol connection is removed from an AE 500 (616), an application and/or the NPS 504 deletes the relevant state information from a connection table 506 (and/or 516, 518, 520) (618), and the table synchronizer 508 sends an update to the PCE 300 to decrement the probability count in the count table 314 for the deleted connection state information (620).

Those skilled in the art will appreciate that the example CSIMs and methods described above could be implemented in even more ways than described herein. Accordingly, various other CSIM configurations will be described.

Figure 7:
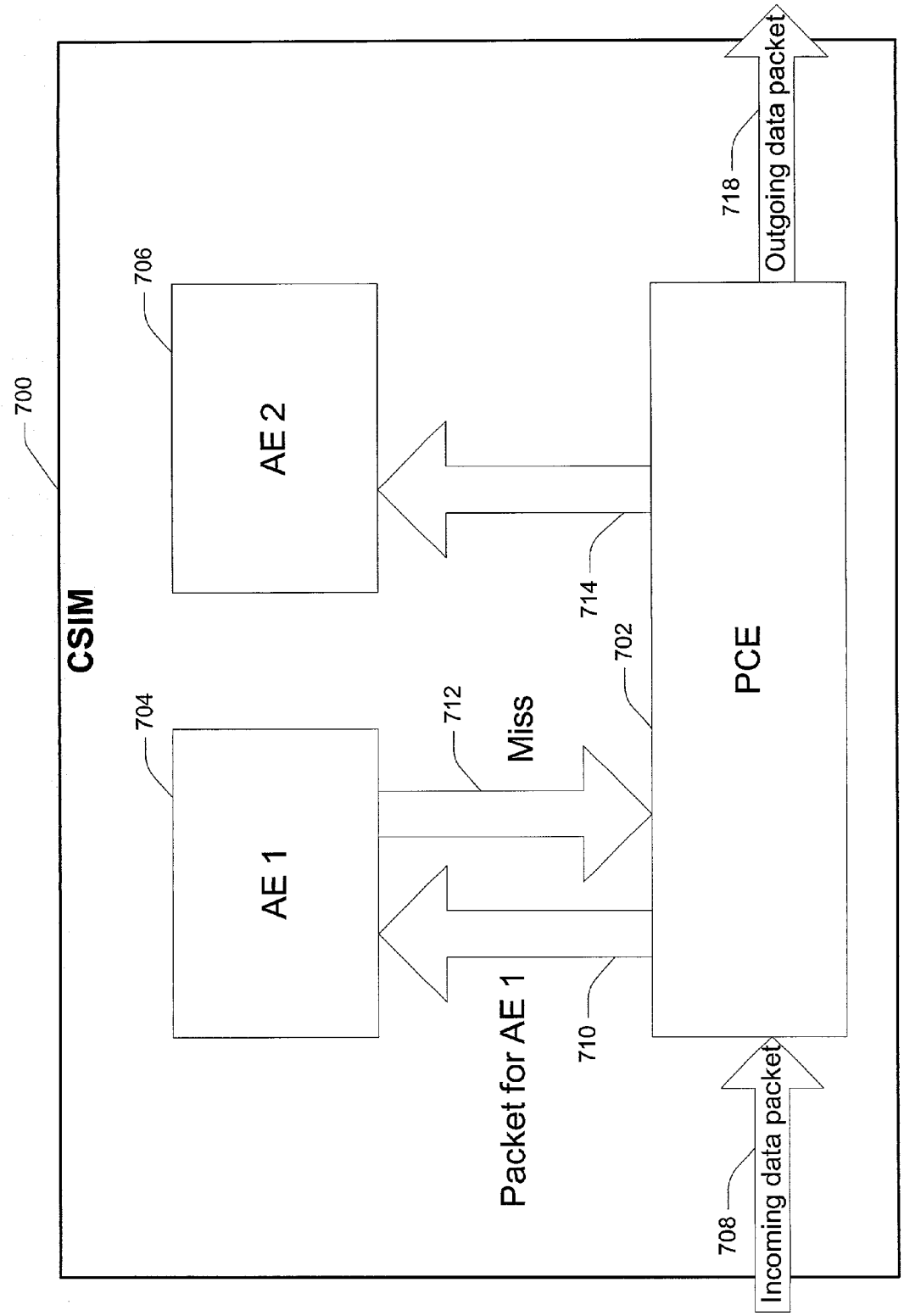
FIG. 7 is a block diagram of an example CSIM, according to one embodiment of the invention.
Figure 8:
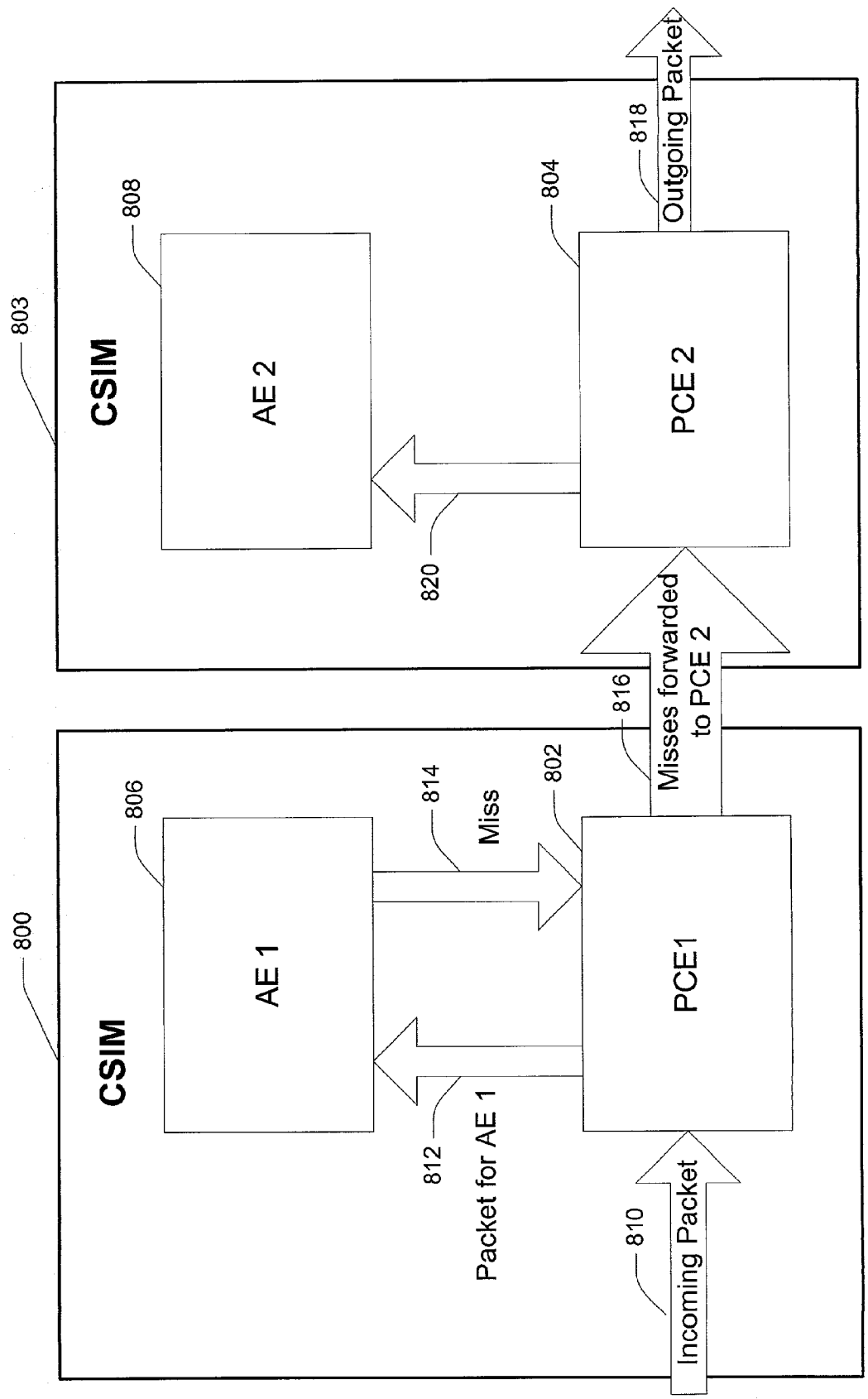
FIG. 8 is a block diagram of example coupled CSIMs, according to another embodiment of the invention.
Figure 9:
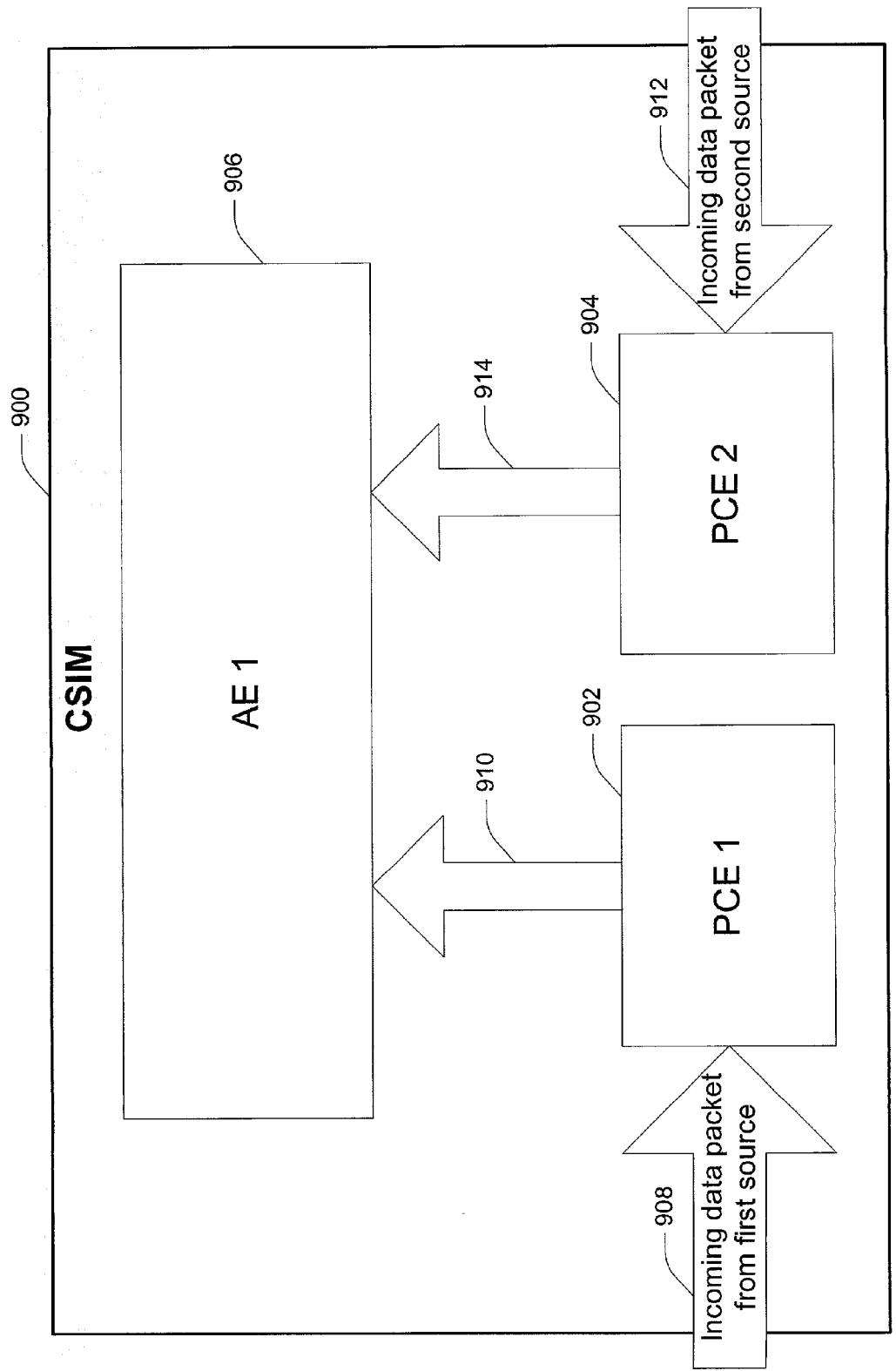
FIG. 9 is a block diagram of an example CSIM, according to yet another embodiment of the invention.

FIGS. 7–9 are block diagrams of various other configurations of PCEs and AEs for spreading applications over multiple processing elements and dividing the implementation of the protocol stack according to the teachings of the invention. The various configurations of processing elements in FIGS. 7–9 demonstrate that there is great flexibility in the way that CSIMs can be used to efficiently forward data packets among network appliances and/or multiple processing elements. It should be noted that other configurations having even more PCEs and/or AEs than the configurations shown in FIGS. 7–9 could be used in a single CSIM.

FIG. 7 is a block diagram of an example CSIM 700 having the configuration of PCE 702 and AEs 704, 706 as illustrated, with example data packet transfer dynamics depicted between the PCE 702, a first AE 704, and a second AE 706. As shown, incoming data packets 708 are classified by the PCE 702 for forwarding. According to one example implementation, the PCE 702 reads an address in the data packet header to direct each data packet to the proper AE 704.

The PCE 702 classifies a data packet and sends the data packet (710) to the first AE 704. If the classification made by the PCE 702 is correct, then the first AE 704 processes the data packet. If the classification is incorrect, a "miss" occurs and the first AE 702 returns the data packet (712) to the PCE 702. The PCE 702 may use a count for the second AE 706 to send 714 the data packet to the second AE 706. However, if the count indicates a zero probability that the data packet should be sent to the second AE 706 then the PCE 702 may output/forward the data packet (718) from the CSIM 700.

FIG. 8 is a block diagram of example CSIMs 800, 803 coupled as illustrated. Data packet transfer is depicted between a first PCE 802, a second PCE 804, a first AE 806, and a second AE 808. This embodiment is typical of a cascaded Internet appliance. An incoming packet 810 is received by the first PCE 802, which forwards the data packet 812 to the first AE 806. If the classification by the first PCE 810 is a miss, the first AE 806 returns the data packet 814 to the first PCE 802. The first PCE 802 then forwards the data packet 816 to the second PCE 804. Depending on the classification of the data packet by the second PCE 804, which is based on a count from a count table corresponding to the second AE 808, the second PCE 804 may either output/forward the data packet 818 from the CSIM 800 or may send the data packet 820 to the second AE 808.

FIG. 9 is a block diagram of yet another example CSIM 900 having the configuration illustrated with example data packet transfer dynamics depicted between a first PCE 902, a second PCE 904, and a single AE 906. In this embodiment, the PCEs 902, 904 may use a mirrored or shared probability count table for the AE 906 or a separate count table for each PCE 902, 904. This CSIM 900 configuration can be used when an application using the AE 906 receives data from two different sources. When an incoming data packet 908 is received from a first source, the first PCE 902 consults the mirrored/shared count table and forwards the data packet 910 to the AE 906 if the count indicates a positive probability that the data packet should be processed by the AE 906. Likewise, when an incoming data packet 912 is received from a second source, the second PCE 904 consults the mirrored/shared count table and forwards the data packet 914 to the AE 906 if the count indicates a positive probability that data packet should be processed by the AE 906.

Figure 10:
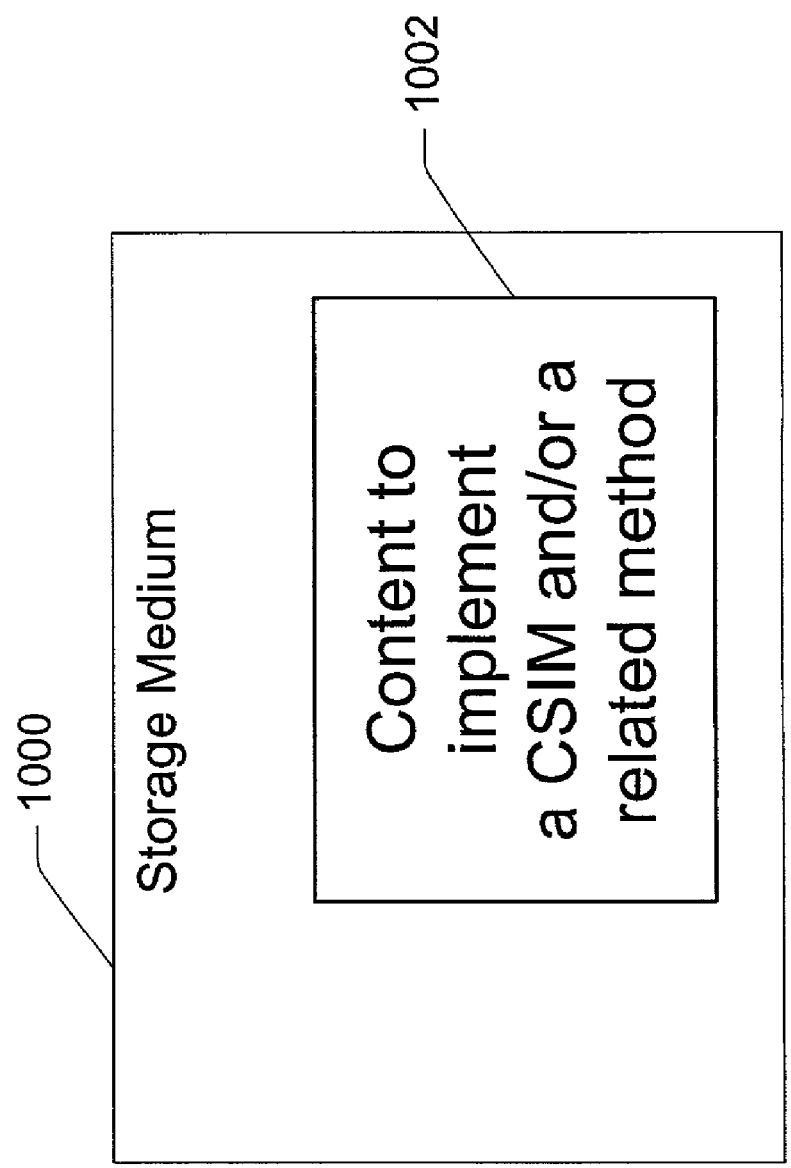
FIG. 10 is a graphic representation of an article of manufacture comprising a machine-readable medium having content, that when executed, causes a machine to implement a CSIM and/or related method of the invention.

FIG. 10 is a graphical representation of an article of manufacture 1000 comprising a machine-readable medium having content 1002, that when executed causes a machine to create a table that correlates information in a data packet with a probability value representing the likelihood that the information is useful to a processing element, and direct the data packet based on the probability value.

In some embodiments, the content 1002, when executed, causes the machine to create a probability value based on protocol connection state information from a protocol state table for the processing element. In some embodiments, the machine directs the data packet to the processing element if the probability value is not zero.

The CSIMs and related methods of the invention described above may be provided partially as a computer program product that may include the machine-readable medium. The machine-readable medium may include, but is not limited to, floppy diskettes, optical disks, CD-ROMs, magneto-optical disks, ROMs, RAMs, EPROMs, EEPROMs, magnetic or optical cards, flash memory, or other type of media suitable for storing electronic instructions. Moreover, parts of the invention may also be downloaded as a computer program product, wherein the program may be transferred from a remote computer to a requesting computer by way of data signals embodied in a carrier wave or other propagation media via a communication link (e.g., a modem or network connection). A CSIM is most flexible as software but could be implemented in hardware.

While the CSIMs and related methods have been described in terms of several embodiments, those skilled in the art will recognize that the invention is not limited to the embodiments described but can be practiced with modification and alteration within the spirit and scope of the appended claims. The description is thus to be regarded as illustrative instead of limiting.

What is claimed is:

1. A method, comprising:
    assigning a probability value to each protocol connection of a processing element;
    obtaining information from a data packet to associate the data packet with a protocol connection;
    forwarding the data packet to the processing element if the probability value assigned to the protocol connection is greater than a threshold,
    hashing the information from the data packet to establish a hash index; and
    using the hash index to access the probability value in a count table representing the protocol connections of the processing element.

2. The method of claim 1, wherein the threshold is zero.

3. The method of claim 1, wherein the hashing comprises hashing at least one of an address, an IP address, a port number, a virtual local area network (VLAN) tag, a multi-protocol label switching (MPLS) tag, a secure socket layer (SSL) session identifier, a protocol session identifier, a message identifier, a transaction identifier, and any other identifier in the header of the data packet to establish the hash index.

4. The method of claim 1, wherein:
    the processing element is an application engine (AE) to implement at least application protocol layers having protocol connections; and
    the forwarding the data packet based on the probability value is performed by a packet classification engine (PCE).

5. The method of claim 4, further comprising using a connection table in the AF to store protocol connection state information.

6. The method of claim 5, further comprising:
    receiving a new-connection data packet to initiate a new protocol connection in the AE; and storing and/or updating protocol connection information in the connection table of the AE based at least in part on information from the new-connection data packet.

7. The method of claim 6, further comprising updating a probability value in the count table based on the updated protocol connection information in the connection table of the AE.

8. The method of claim 7, further comprising removing protocol connection information from the connection table of the AE including decrementing a count in the count table of the PCE based on the protocol connection to be removed.

9. The method of claim 8, further comprising:
sending the data packet from the PCE to the AE based on a probability value in the count table;
checking the connection table of the AE to see if the data packet corresponds to a current protocol connection of the AE; and
returning the data packet to the PCE if the data packet does not correspond to a current protocol connection of the AE.

10. The method of claim 9, further comprising forwarding the data packet from the PCE to a subsequent AE based on a probability value in a count table associated with the subsequent AE.

11. The method of claim 10, further comprising performing additional processing on the data packet before forwarding the data packet from the PCE to the AE.

12. A method, comprising:
creating a table that correlates information in a data packet with a probability value representing the likelihood that the information is useful to a processing element;
directing the data packet based on the probability values,
hashing the information from the data packet to establish a hash index; and
using the hash index to access the probability value in the table representing the protocol connections of the processing element.

13. The method of claim 12, further comprising creating a probability value based on protocol connection state information from a protocol state table for the processing element.

14. The method of claim 13, wherein the data packet is directed to the processing element if the probability value is greater than a threshold.

15. The method if claim 14, wherein the threshold is zero.

16. An apparatus, comprising:
an application engine (AE) to execute applications, the AE having protocol connections;
a packet classification engine (PCE), the PCE to receive a data packet, to correlate information in the data packet with a probability value representing the likelihood that the information is useful to the AE, and to direct the data packet based on the probability value;
a hash engine that operates to hash a header in the data packet; and
a data packet analyzer coupled to the hash engine to direct the data packet based on the probability value.

17. The apparatus of claim 16, the PCE further comprising a packet processing engine, including:
a data packet receiver coupled to the hash engine.

18. The apparatus of claim 17, wherein the packet processing engine reads and/or hashes at least one of an address, an IP address, a port number, a virtual local area network (VLAN) tag, a multiprotocol label switching (MPLS) tag, a secure socket layer (SSL) session identifier, a protocol session identifier, a message identifier, a transaction identifier, and any other identifier in the header of the data packet to establish the hash index.

19. The apparatus of claim 18, further comprising a count table to correlate a hash value from the data packet with a probability value.

20. The apparatus of claim 16, the AE further comprising:
a network protocol stack (NPS) to implement a set of network protocol layers;
at least one application protocol stack (APS) in the AE to implement a set of application protocol layers; and
at least one state information table in the AE to store connection state information from at least one of the NPS and an APS.

21. The apparatus of claim 20, wherein the state information table is one of an application connection state table and a protocol connection state table.

22. An article of manufacture, comprising a machine-readable medium having content, that when executed, causes a machine to:
create a table that correlates information in a data packet with a probability value representing the likelihood that the information is useful to a processing element;
direct the data packet based on the probability value;
hashing the information from the data packet to establish a hash index; and
using the hash index to access the probability value in the table representing the protocol connections of the processing element.

23. The article of manufacture of claim 22, further comprising content, that when executed, causes a machine to create a probability value based on protocol connection state information from a protocol state table for the processing element.

24. The article of manufacture of claim 23, further comprising content, that when executed, causes a machine to direct the data packet to the processing element if the probability value is greater than a threshold.

25. The article of manufacture of claim 24, wherein the threshold is zero.

26. A method, comprising:
assigning a probability value to each protocol connection of a processing element;
obtaining information from a data packet to associate the data packet with a protocol connection;
forwarding the data packet to the processing element if the probability value assigned to the protocol connection is greater than a threshold, wherein the threshold is zero.

27. A method, comprising:
creating a table that correlates information in a data packet with a probability value representing the likelihood that the information is useful to a processing element;
directing the data packet based on the probability value, wherein the data packet is directed to the processing element if the probability value is greater than a threshold, and the threshold is zero.

* * * * *